United States Patent
Miller

(10) Patent No.: US 11,073,978 B2
(45) Date of Patent: Jul. 27, 2021

(54) COMPUTER-IMPLEMENTED METHODS, COMPUTER-READABLE MEDIA AND ELECTRONIC DEVICES FOR VIRTUAL CONTROL OF AGRICULTURAL DEVICES

(71) Applicant: LINDSAY CORPORATION, Omaha, NE (US)

(72) Inventor: Mark William Miller, Elkhorn, NE (US)

(73) Assignee: Lindsay Corporation, Omaha, NE (US)

( * ) Notice: Subject to any disclaimer, the term of this patent is extended or adjusted under 35 U.S.C. 154(b) by 0 days.

(21) Appl. No.: 16/872,579

(22) Filed: May 12, 2020

(65) Prior Publication Data
US 2020/0272317 A1     Aug. 27, 2020

Related U.S. Application Data

(63) Continuation of application No. 16/029,070, filed on Jul. 6, 2018, now Pat. No. 10,732,812.

(51) Int. Cl.
*G06F 3/0484*    (2013.01)
*G06F 3/0485*    (2013.01)
(Continued)

(52) U.S. Cl.
CPC ........ *G06F 3/04847* (2013.01); *G06F 3/0485* (2013.01); *G06F 3/0488* (2013.01);
(Continued)

(58) Field of Classification Search
CPC ............ G06F 3/04847; G06F 3/04842; G06F 3/0488; G06F 3/0485; G06F 9/547; G06N 20/00; G06T 19/00
See application file for complete search history.

(56) References Cited

U.S. PATENT DOCUMENTS

| | | | |
|---|---|---|---|
| 6,611,201 B1 * | 8/2003 | Bishop | B60R 25/04 340/12.5 |
| 2012/0101861 A1 * | 4/2012 | Lindores | G06Q 10/063 705/7.11 |

(Continued)

FOREIGN PATENT DOCUMENTS

EP     3089493 A1 * 11/2016 ............. A01B 76/00

*Primary Examiner* — Tadesse Hailu
(74) *Attorney, Agent, or Firm* — Hovey Williams LLP

(57) ABSTRACT

A method for controlling a plurality of mobile agricultural devices that includes establishing electronic communication with a plurality of transceivers mounted to the mobile agricultural devices and building a model including a virtual representation of each of the mobile agricultural devices. The method also includes displaying the model at a user interface including a display and a gesture sensor. The method further includes receiving location data regarding the mobile agricultural devices via the transceivers and adjusting at least one of the virtual representations of the mobile agricultural devices within the model to reflect the location data. The method still further includes receiving, via the gesture sensor of the user interface, a user input comprising a command relating to operation of a first one of the mobile agricultural devices and transmitting the user input command to one of the transceivers, which is mounted to the first mobile agricultural device, so as to implement a change in operation of the first mobile agricultural device.

20 Claims, 5 Drawing Sheets

(51) Int. Cl.
*G06F 3/0488* (2013.01)
*G06T 19/00* (2011.01)
*G06N 20/00* (2019.01)
*G06F 9/54* (2006.01)

(52) U.S. Cl.
CPC ......... *G06F 3/04842* (2013.01); *G06N 20/00* (2019.01); *G06T 19/00* (2013.01); *G06F 9/547* (2013.01)

(56) References Cited

U.S. PATENT DOCUMENTS

2014/0039696 A1* 2/2014 Andrews ............ G05B 19/0426
700/284
2018/0070527 A1* 3/2018 Richt .................. A01B 79/005

\* cited by examiner

COMPUTER-IMPLEMENTED METHODS, COMPUTER-READABLE MEDIA AND ELECTRONIC DEVICES FOR VIRTUAL CONTROL OF AGRICULTURAL DEVICES

RELATED APPLICATION

This patent application is a continuation, and claims priority benefit with regard to all common subject matter, of earlier-filed U.S. patent application Ser. No. 16/029,070, filed on Jul. 6, 2018, and entitled "COMPUTER-IMPLEMENTED METHODS, COMPUTER-READABLE MEDIA AND ELECTRONIC DEVICES FOR VIRTUAL CONTROL OF AGRICULTURAL DEVICES" which is hereby incorporated by reference in its entirety into the present application.

FIELD OF THE INVENTION

The present disclosure generally relates to computer-implemented methods, systems comprising computer-readable media and electronic devices for monitoring a farm. More particularly, embodiments of the invention relate to a plurality of transmitters and a computing device or controller hosting and/or providing instructions to a graphical user interface that allows users to review and revise real-time or near real-time, farm-related data and/or alter equipment operational settings.

BACKGROUND

Modern farms often have several types of equipment that are each controlled by a control system. Disparate farm equipment control systems may comprise a mix of manual, automated and/or remote-control systems, each system being responsible for independently controlling a different piece of equipment. For instance, a combine may be automatically controlled in whole or in part using one or more sensors providing feedback data to a processing unit, the processing unit providing operational adjustment commands based on analysis of the feedback data. Meanwhile, an irrigation machine may be controlled in whole or in part using a collection of sensors providing data to a central server, the central server providing data to a user interface (e.g., at a laptop workstation) and/or smart controller for adjusting equipment operation (e.g., valve switching) in view of the data.

Existing farms therefore essentially utilize multiple disjointed control silos for operating farm equipment. Information is presented to users and/or smart controllers with limited context, which restricts the ability of the users to quickly and efficiently determine desirable adjustments and/or assess efficacy of equipment operation at a fundamental level.

BRIEF SUMMARY

Embodiments of the present technology relate to computer-implemented methods, systems comprising computer-readable media, and electronic devices for monitoring farm equipment. Embodiments provide for a graphical user interface that allows users to review and revise real-time or near real-time, farm-related data and/or alter equipment operational settings.

In a first aspect, a computer-implemented method for controlling a plurality of mobile agricultural devices may be provided. The method includes establishing electronic communication with a plurality of transceivers mounted to the mobile agricultural devices and building a model including a virtual representation of each of the mobile agricultural devices. The method also includes displaying the model at a user interface including a display and a gesture sensor. The method further includes receiving location data regarding the mobile agricultural devices via the transceivers and adjusting at least one of the virtual representations of the mobile agricultural devices within the model to reflect the location data. The method still further includes receiving, via the gesture sensor of the user interface, a user input comprising a command relating to operation of a first one of the mobile agricultural devices and transmitting the user input command to one of the transceivers, which is mounted to the first mobile agricultural device, so as to implement a change in operation of the first mobile agricultural device. The method may include additional, fewer, or alternative actions, including those discussed elsewhere herein, and may be implemented via one or more local or remote processors, and/or via computer-executable instructions stored on non-transitory computer-readable media or medium.

In another aspect, a system comprising computer-readable media for controlling a plurality of mobile agricultural devices may be provided. The system may include a non-transitory computer-readable medium with a program stored thereon, wherein the program instructs a hardware processing element of a device to perform the following: (1) establish electronic communication with a plurality of transceivers mounted to the mobile agricultural devices; (2) build a model including a virtual representation of each of the mobile agricultural devices; (3) display the model at a user interface including a display and a gesture sensor; (4) receive location data regarding the mobile agricultural devices via the transceivers; (5) adjust at least one of the virtual representations of the mobile agricultural devices within the model to reflect the location data; (5) receive, via the gesture sensor of the user interface, a user input comprising a command relating to operation of a first one of the mobile agricultural devices; and (6) transmit the user input command to one of the transceivers, which is mounted to the first mobile agricultural device, so as to implement a change in operation of the first mobile agricultural device. The program(s) stored on the computer-readable media may instruct the processing elements to perform additional, fewer, or alternative actions, including those discussed elsewhere herein.

In yet another aspect, a computing device for controlling a plurality of mobile agricultural devices may be provided. The computing device may include a communication element, a memory element, and a processing element. The communication element may be configured to provide electronic communication with a communication network. The processing element may be electronically coupled to the memory element and to the communication element. The processing element may be configured to: (1) establish electronic communication with a plurality of transceivers mounted to the mobile agricultural devices; (2) build a model including a virtual representation of each of the mobile agricultural devices; (3) display the model at a user interface including a display and a gesture sensor; (4) receive location data regarding the mobile agricultural devices via the transceivers; (5) adjust at least one of the virtual representations of the mobile agricultural devices within the model to reflect the location data; (5) receive, via the gesture sensor of the user interface, a user input comprising a command relating to operation of a first one of the mobile agricultural devices; and (6) transmit the user input command to one of the transceivers, which is mounted to the first mobile agricultural device, so as to implement a change in operation of the first mobile agricultural device. The computing device may include additional, fewer, or alternate components and/or functionality, including that discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of computer-implemented methods, systems comprising computer-readable media, and electronic devices disclosed therein. It should be understood that each Figure depicts an embodiment of a particular aspect of the disclosed methods, media, and devices, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1:
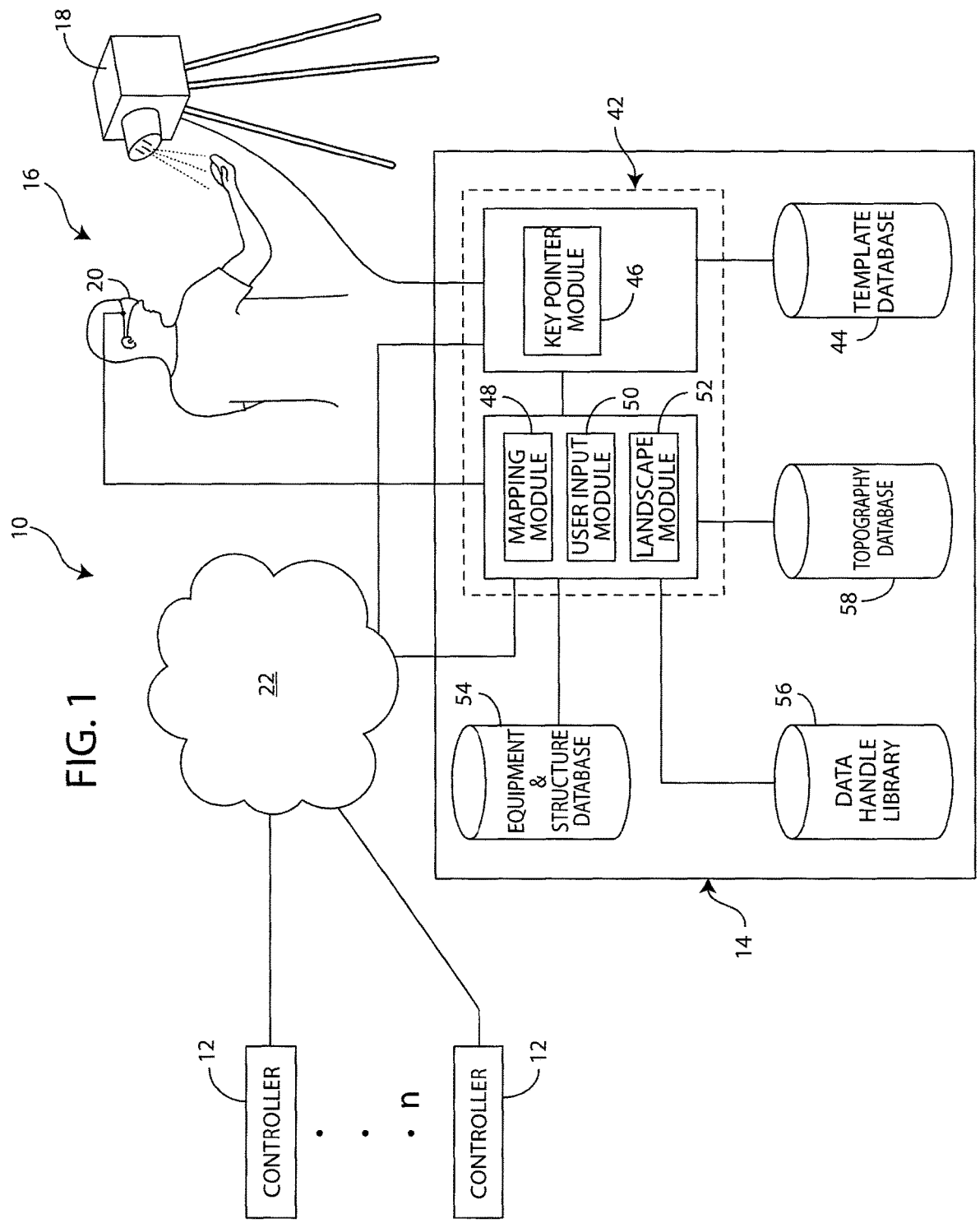
FIG. 1 illustrates an exemplary environment in which various components of a computing device may be utilized, the computing device configured to communicate electronically with a plurality of local controllers, control a graphical user interface, and receive user input via the graphical user interface, all in accordance with aspects of the present embodiments.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, a system including a plurality of communication elements (e.g., transmitters) respectively freestanding or mounted to a plurality of farm implements, structures and devices, and a graphical user interface hosted by and/or in communication with a computing device. The computing device may execute a virtual control program having a mapping module. The mapping module may receive data via the transmitters about a farm. The mapping module may generate instructions based at least in part on the data from the transmitters for displaying virtual representations of the farm implements and structures at the graphical user interface.

The mapping module may also maintain and/or access an equipment and structure database containing data regarding the farm equipment and structures. For instance, the equipment and structure database may contain data regarding vehicles and farm tools, such as data regarding fuel storage capacity, top speed, tool span and other dimensional characteristics, seed and/or fertilizer storage capacity and/or spread rate, and other data useful in viewing and/or simulating farm operations.

The virtual control program may also include a landscape module for generating instructions for display of virtual representations of the topography and natural characteristics of the farm within the model. The landscape module may be in communication with a topography database configured to store topography and natural characteristic data. The topography data may be derived, for example, from one or more remote sensing and/or direct survey data collection means. For example, topography data may be gathered via interferometric synthetic aperture radar, optical image recording apparatus, other similar recording means and/or from computer data/files including 2D or 3D images and/or models. The topography data may also include natural characteristics of the farm, such as soil measured/estimated moisture content, nitrogen content, crop rotation history and/or readiness for planting/harvesting, water reservoir volume, and other characteristics of the farm.

The landscape module may also receive data from the transmitters for incorporation into instructions for generating topographical and natural characteristic model elements within the model. For example, the landscape module may receive rainfall data from a transmitter mounted to a weather station on the farm that includes a rain gauge, and may incorporate the data into the topography database and/or instructions for display of the topography and natural characteristics of the farm. For another example, one or more transmitters may be in communication with location determining elements (e.g., global positioning system transmitter(s)), may be mounted on mobile farm equipment, and may provide location data to the landscape module that may be recorded in the topography database to improve the accuracy of the topographical data stored therein and/or may be used to generate the model.

It is also foreseen that the mapping module and/or the landscape module may receive data from external data sources and/or via input provided by a user without departing from the spirit of the present invention. For example, a weather service application programming interface may feed real-time or near real-time rainfall data to the landscape module so that the landscape module may update soil moisture content and/or water reservoir volume estimates and representations respectively within the topography database and the model. For another example, a GPS or the like may provide location information regarding farm implements to the mapping module for incorporation into the virtual representations of the implements within the model. For still another example, an implement manufacturer may issue a maintenance bulletin and/or recall, which may be communicated to the mapping module (e.g., via an API in communication with the computing device), and incorporated into the model for display to the user as, for example, an alert notification data handle. For still yet another example, one or more of the databases described herein may be stored remotely, for example by a cloud storage service, without departing from the spirit of the present invention.

The mapping module may place farm equipment and structure representations within the model so that a plurality of relative distances between the equipment, structure, static landmarks and/or topographical or natural component representations (each a "tangible element" and referred to collectively with data elements discussed below as "elements" of the model) are substantially to scale. One or more tangible elements may not be represented to scale (e.g., each farm implement may be enlarged from its actual scalar size with respect to topographical elements to enhance visibility to the user). The mapping module may be configured to automatically scale model elements of a certain type—e.g., farm implements—differently than other types of model elements (e.g., topographical elements). A user may also be permitted to select one or more model elements and toggle between scalar and non-scalar settings manually.

The mapping module may also be configured to generate instructions for display of model elements comprising abstract data elements or "handles," each handle containing one or more data types and/or algorithms relating to one or more other model elements. Each data handle may be associated with and/or positioned by the mapping module within the model proximate one or more tangible model elements to which it relates. For instance, the data type may be a flow rate, a growth rate, a retention period, a speed, a position relative to another model element, or other data or algorithm(s) relating to the model. For another example, a soil moisture content data handle may be positioned above a middle of a field section to which the measurement applies. For still another example, a flow rate data handle may be positioned along a pipe carrying the flow at its inlet, outlet and/or midway between the inlet and the outlet. A pressure drop algorithm data handle may be organized with and placed adjacent to (and possibly stacked behind) the flow rate data handle so the user may optionally see and understand a basis for a drop in flow rate between two points in a pipeline. Such algorithms may comprise ideal or quasi-ideal models for estimating physical states or conditions for elements within the model and/or may be at least partially determined through data regression or the like given two or more measured values without departing from the spirit of the present invention.

The virtual control program may include instructions for permitting user input of data handles, for example where a user manually inputs a soil moisture content measured in a field, or a pressure value taken at a point along a pipeline. Preferably, the virtual control program also accesses a database containing a library of data handle types. More preferably, the library of data handle types includes pre-configured settings defining placement of each data handle type within the model in relation to—as well as functional relationships between the data handle type and—tangible model elements.

Reference to the library of data handle types may cause the computing device to request additional input from the user in order to properly define a data handle's placement within the model and functional relation to tangible model elements. For instance, the user may choose to add a "Flow Rate"-type data handle, causing the computing device to pose a series of associated inquiries from the library of data handle types via the graphical user interface. The computing device may query the user to select one or more tangible model elements to which the flow rate applies (e.g., a pump station outlet, a pipe, and an irrigation unit outlet), and may request the user to select whether pressure drop over the selected model elements should be considered/entered/estimated. In embodiments including rich algorithmic and/or simulation software components, manually input and/or automatically detected information in data handles may flow down to other affected data handles once given a minimum level of definition (i.e., interrelation to tangible and/or data elements in the model), for example where a flow rate and surrounding topographical elements are used at least in part to calculate a water reservoir volume. In this manner, the user is permitted to select and attach contextually valuable data elements and to define functional as well as spatial interrelationships between model elements, providing valuable context for observing and controlling farm operations.

Data handles may also be included and populated in the model automatically by the mapping module by reference to the library of data handle types. For instance, where the mapping module instructs display of a tractor within the model, the mapping module may be configured to automatically generate and populate five data handles according to the pre-configured settings stored in the library of data handle types. These data handles may include hours the tractor has been in operation, fuel level, hours a driver has been working, estimated time to field completion, and ground working tool being used on the tractor, for example. The automatically populated data handles may be manipulated, supplemented and/or deleted by a user via the graphical user interface. The data handles may be set for real-time or near real-time rolling or batch-based updates from respective databases and/or local controllers of the system (see discussion below) and/or for updates on particular time schedules or upon user demand.

The data handles may be related, dragged and/or otherwise selected and re-organized within the model. For example, data handles may optionally be grouped, stacked and/or collapsed/expanded individually or in groups by user input, for example to improve the user's visual experience within the model. Such spatial organization(s) of data handles may be pre-configured for optimal viewing according to settings stored in the library of data handle types, and such settings may be customizable and/or may vary depending on model element and/or data handle type(s). Such settings may also be dynamic and take into account changing conditions of the model. For example, a flow rate data handle may be subordinated or stacked "below" another data handle attached to a pipeline under normal operating conditions. However, if a measured pressure at an outlet fitting of the pipeline drops below a pre-determined level during operation of an upstream pump, the flow rate data handle may automatically be made visible to the user, for example with an alert indicator and/or coloration indicating an abnormal condition was detected that may indicate low water availability and/or an obstruction to flow. Such an alert indicator and/or coloration may be used to indicate: normal operation; abnormal operation; the need for additional water (i.e., low moisture content in soil and/or low water supply in an animal containment structure); the need to operate a heat exchange device to regulate temperature inside a structure; a low water condition at a storage pond; proper or improper operation of a grain storage facility; a low tire pressure; or other statuses or conditions.

The user may relate two model elements (e.g., two data handles, a tangible element and a data handle, etc.) by clicking each within the model and choosing to define a relationship therebetween. The relationship may, for example, constitute a temporary spatial operational limit dependent on one or more conditions on the farm. Spatial parameters may be selected or drawn within the model by user input, providing simple means for interrelating model elements and operational limits within the at least partially scalar model. Therefore, in an embodiment, a user may use manual gesture control within the model to define a boundary—such as around a "low" area of the farm near a water reservoir—as well as a soil moisture content threshold. The user may also select one or more mobile tangible elements in the model, such as a tractor, and restrict any movement of the tractor within the defined low area in the event the soil moisture content threshold is exceeded.

The data handles may also be functionally subordinated to one another (e.g., by instructing that a data handle A be optimized while data handle B is maintained within a given range) or otherwise interrelated within the ambit of the invention.

A user may manipulate the model and/or provide user input using gesture control, as will be discussed in more detail below. The user input may be provided via any known system for capturing discrete and/or continuous user motion(s) and translating same to an effect to be achieved within the model.

The mapping module and/or an associated modeling module may be configured for operational and/or simulation modes. For instance, a user may initiate display of the model populated using real time data regarding the constituent model elements, and may subsequently work within a simulation mode (with or without real-time or near real-time updates regarding the model elements). Selections and/or changes made by the user in simulation mode may not be carried out outside of the simulation in the absence of specific implementation instructions given by the user. New settings and/or operational parameters may be entered at data handles and/or in separate data fields made available to the user, and mobile equipment and/or structures may be repositioned via user input.

Simulation modes may assist the user in planning and/or visualizing a future condition—for example, relative positions of farm equipment assuming a time lapse and/or new speed settings, degree of soil saturation assuming a time lapse and/or new flow rate, etc. Simulation modes may also permit the user to better observe behavioral relationships between model elements, such as where two functionally separate pieces of mobile equipment operate on the same or related physical substances, plants and/or animals on a farm. Preferably, the events of a simulation are saved by the computing device so that the user may instruct the computing device to implement one or more simulated changes on the farm as desired following simulation.

The user may also change operational parameters and/or settings for equipment and structures represented in the model. For example, the user may use gesture control within a 3D model to select a data handle associated with a tangible element, e.g., by selecting a gate status data handle associated with a paddock or by selecting a tractor speed data handle associated with a tractor. The user may choose an edit operation for the data handle, for example by selecting the data handle a second time to prime the handle for the user input, followed by entering a new value. For instance, the user may edit a tractor speed within the tractor speed data handle or may choose to actuate a gate controlling animal movement within the paddock by selecting "Up" within the gate status data handle. The change in parameter(s) and/or setting(s) may be communicated via the computing device to local controller(s) mounted to such equipment and structure(s), and the local controller(s) may issue commands to actuating mechanisms with which they are in communication to carry out the changes flowing from the user's editing of the model. In the example noted above, a local controller mounted to the tractor may issue a speed change command to a throttle directly controlled by the local controller and/or to an onboard original equipment manufacturer smart controller to carry out the change in speed. Likewise, a local controller comprising a switch for actuating an electric motor that drives the gate at the paddock may issue a command causing the electric motor to raise or lower the gate.

Also, because the tangible elements and data handles in the model are related to one another in many cases, manual changes to operational parameters/settings made by the user may automatically flow down to related operational settings, causing automated secondary commands to be issued to compensate for the changes entered by the user. For instance, a combine performing harvesting operations may be trailed by a baling implement, and a command to speed the combine up issued by the user manually may automatically trigger a secondary command to the trailing baling implement causing it to increase its speed to match the combine. Such automated secondary actions may also apply to relationships the user defines between model elements. In the example discussed previously, the user's designation of a "low area" within which a tractor should not travel in wet conditions may automatically flow down to other mobile equipment as well.

Embodiments of the present invention provide a dynamic model within which farm equipment, natural characteristics, systems and structures may be spatially viewed, related and/or manipulated based on real-time or near real-time data and/or simulated conditions. The limitations of prior art control silos may therefore be addressed to provide a user with improved control over farm operations.

I. Exemplary System

FIG. 1 depicts an exemplary system 10 for reviewing and revising real-time or near real-time, farm-related data and/or altering equipment operational parameters/settings. The depicted embodiment of the invention includes a plurality of local controllers 12; a computing device 14; a user interface 16 including a gesture sensor 18 and a display 20; and a communication network 22 for providing electronic communication between all or some of the components of the system 10.

Each of the plurality of n local controllers 12 includes a communication element 24 (see FIG. 2) for transmitting data regarding present conditions surrounding the controller 12 and/or regarding equipment and/or structure(s) to which the controller 12 is mounted. The computing device 14 may receive the data, and use the data to build a representational model of the farm including equipment, structures and landscape. The computing device 14 may control display of the model via the user interface 16. The computing device 14 may also receive manual input via the user interface 16 from a user. The input may relate to positioning of elements within the model, to metadata and/or physical state data regarding the elements within the model, and/or to settings or parameters for the model elements including operational commands to be implemented at farm equipment and/or structure(s).

The communication network 22 generally allows communication between the components of the system 10. The communication network 22 may include local area networks, metro area networks, wide area networks, cloud networks, the Internet, and the like, or combinations thereof.

The communication network 22 may be wired, wireless, or combinations thereof and may include components such as switches, routers, hubs, access points, and the like. The components of the system 10 may connect to the communication network 22 and/or to the other components of the system 10 either through wires, such as electrical cables or fiber optic cables, or wirelessly, such as radio frequency (RF) communication using wireless standards such as Bluetooth® or the Institute of Electrical and Electronic Engineers (IEEE) 802.11.

Returning to FIG. 2, each local controller 12 may include one or more of communication element 24, a user interface 26, a location determining element 28, a sensing element 30, a memory element 32, and a processing element 34.

The communication element 24 may include signal or data transmitting and receiving circuits, such as antennas, amplifiers, filters, mixers, oscillators, digital signal processors (DSPs), and the like. The communication element 24 may establish communication wirelessly by utilizing RF signals and/or data that comply with communication standards such as cellular 2G, 3G, or 4G, IEEE 802.11 standard such as WiFi, IEEE 802.16 standard such as WiMAX, Bluetooth™, or combinations thereof. Alternatively, or in addition, the communication element 24 may establish communication through connectors or couplers that receive metal conductor wires or cables which are compatible with networking technologies such as ethernet. In certain embodiments, the communication element 24 may also couple with optical fiber cables. The communication element 24 may be in communication with or electronically coupled to the user interface 26, the location determining element 28, the sensing element 30, the memory element 32, and/or the processing element 34.

The user interface 26 may comprise a control panel for a piece of farm equipment, for example, and may be a graphical user interface including a display. The display may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The display may include a screen on which information is presented, with the screen possessing a square or a rectangular aspect ratio that may be viewed in either a landscape or a portrait mode. In various embodiments, the display may also include a touch screen occupying the entire screen or a portion thereof so that the display functions as part of the user interface 26. The touch screen may allow the user to interact with the local controller 12 by physically touching, swiping, or gesturing on areas of the screen. The display may be capable of displaying 2D and/or 3D representations and/or models.

The user interface 26 generally allows the user to utilize inputs and outputs to interact with the local controller 12. Input means may include buttons, pushbuttons, knobs, jog dials, shuttle dials, directional pads, multidirectional buttons, switches, keypads, keyboards, mice, joysticks, gesture control sensor(s), microphones, or the like, or combinations thereof. Outputs may include audio speakers, lights, dials, meters, printers, or the like, or combinations thereof. With the user interface 26, the user may be able to control the features and operation of the display. For example, the user may be able to zoom in and out on the display using the user input means. In addition, the user may be able to pan the image on the display either by touching and swiping the screen of the display, using multidirectional buttons or dials, and/or by performing a series of gestures detected by the user interface 26 and/or the sensing element 30 and converted into a pan command for altering the output of the display.

The user interface 26 may also permit the user to change operational settings of farm equipment and/or structures to which the local controller 12 is mounted and/or with which it is in communication, substantially in accordance with the discussions below.

The location determining element 28 generally determines a current geolocation of the local controller 12 and may receive and process radio frequency (RF) signals from a global navigation satellite system (GNSS) such as the GPS primarily used in the United States, the GLONASS system primarily used in the Soviet Union, or the Galileo system primarily used in Europe. The location determining element 28 may accompany or include an antenna to assist in receiving the satellite signals. The antenna may be a patch antenna, a linear antenna, or any other type of antenna that may be used with location or navigation devices. The location determining element 28 may include satellite navigation receivers, processors, controllers, other computing devices, or combinations thereof, and memory. The location determining element 28 may process a signal, referred to herein as a "location signal", from one or more satellites that includes data from which geographic information such as the current geolocation is derived. The current geolocation may include coordinates, such as the latitude and longitude, of the current location of the local controller 12. The location determining element 28 may communicate the current geolocation to the processing element 34, the memory element 32, and/or the communication element 24.

Although embodiments of the location determining element 28 may include a satellite navigation receiver, it will be appreciated that other location-determining technology may be used. For example, cellular towers or any customized transmitting radio frequency towers may be used instead of satellites to determine the location of the local controller 12 by receiving data from at least three transmitting locations and then performing basic triangulation calculations to determine the relative position of the device with respect to the transmitting locations. In certain simple embodiments, a local controller may comprise a transmitter without a dedicated location determining element. With such a configuration, any standard geometric triangulation algorithm may be used to determine the location of the local controller.

The location determining element 28 may also include or be coupled with a pedometer, accelerometer, compass, or other dead-reckoning components which allow it to determine the location of the controller 12. The location determining element 28 may determine the current geographic location through a communications network, such as by using Assisted GPS (A-GPS), or from another electronic device. The location determining element 28 may even receive location data directly from a user.

The sensing element 30 may include a gyroscope, motion sensor, accelerometer, motion detector, contact sensor, fuel gauge, weight sensor, thermometer, anemometer, barometric pressure sensor, vessel pressure sensor (e.g., tire pressure gauge), water sensor, air and/or water pollution detector, flow rate sensor, light sensor, photographic element, or other sensor for detecting a relevant physical condition and/or change in condition on the farm. A photographic element may include cameras, as are known in the art, or other optical sensor and lens combinations capable of generating still image and/or video files. In various embodiments, the sensing element 30 may be integrated in a housing or body of the local controller 12, though it may also be physically separate from the remainder of the local controller 12 and in electronic communication therewith. One of ordinary skill will appreciate that a controller 12 having multiple sensing elements 30—for instance an optical sensor for sensing user input in the form of gesture control plus a water pressure sensor—is clearly within the ambit of the present invention.

The memory element 32 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 32 may be embedded in, or packaged in the same package as, the processing element 34. The memory element 32 may include, or may constitute, a "computer-readable medium." The memory element 32 may store the instructions, code, code segments, software, firmware, programs, applications, apps, services, daemons, or the like that are executed by the processing element 34. The memory element 32 may also be in electronic communication with the user interface 26, location determining element 28, and/or sensing element 30 store commands for execution, equipment settings/parameters, environmental and/or operational data or logs, metadata, photographs, audiovisual files, databases, and the like.

The processing element 34 may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 34 may generally execute, process, or run instructions, code, code segments, software, firmware, programs, applications, apps, processes, services, daemons, or the like. The processing element 34 may also include hardware components such as finite-state machines, sequential and combinational logic, and other electronic circuits that may perform the functions necessary for the operation of the current invention. The processing element 34 may be in communication with the other electronic components through serial or parallel links that include address busses, data busses, control lines, and the like. The processing element 34 may be programmed or configured, via hardware, software, firmware, or combinations thereof, to perform all or a portion of the functions outlined herein and attributed to the local controller 12 and/or the computing device 14.

Figure 3:
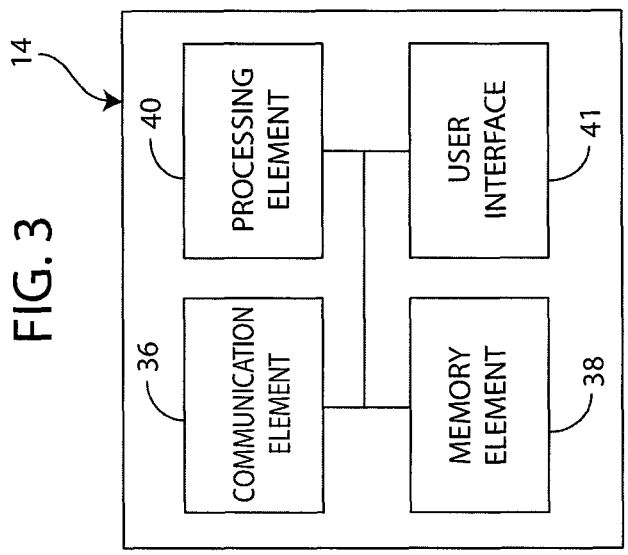
FIG. 3 illustrates various components of an exemplary computing device shown in block schematic form.

Turning now to FIG. 3, the computing device 14 may be embodied by a personal computer such as a desktop workstation and/or laptop computer, and/or by application servers, database servers, file servers, gaming servers, mail servers, print servers, web servers, or the like, or combinations thereof, and may broadly comprise a communication element 36, a memory element 38, a processing element 40 and a user interface 41. The communication element 36, the memory element 38, the processing element 40 and the user interface 41 may respectively be constructed similarly to the communication element 24, the memory element 32, the processing element 34 and the user interface 26 according to the description above. The processing element 40 may be programmed or configured, via hardware, software, firmware, or combinations thereof, to perform all or a portion of the functions outlined herein and attributed to the local controller 12, the computing device 14, and/or the user interface 16.

Particularly, and returning to FIG. 1, the processing element 40 is configured to execute a virtual control program 42, as described in more detail below. The virtual control program 42 is configured to generate instructions for display of virtual representations of farm equipment and structures, as well as topographical and natural characteristic data and data handles relating to the farm. The virtual control program 42 therefore directly or indirectly (e.g., via commercially available 3D rendering software as discussed below) instructs display of a virtual representation or model of the farm at the user interface 16, and receives user input from the user interface 16.

The display 20 of the user interface 16 may be similarly constructed to the display of the user interface 26 according to the description above. The display 20 may also or alternatively display a 3D visual model to the user, the model being based at least in part on data received from the local controllers 12 in real-time or near real-time. For instance, the user interface 16 may include a headset and hand controller sold by Oculus VR, LLC under the trademark Oculus®, and may operate in conjunction with image rendering software sold in association therewith.

Another exemplary gesture sensor 18 may include a system sold by Microsoft Corporation under the trademark Kinect®. In an embodiment, the gesture sensor 18 may include an optical sensor device (such as the camera(s) of the Kinect® system) configured to provide data for comparison against a template database 44 relating certain body movements to desired changes to and/or movements within the model. In an embodiment, the gesture sensor 18 may sense user motion and transmit resulting data to the computing device 14. The virtual control program 42 may analyze the data to identify key pointers and/or body parts of the user within a key pointer module 46 and relate movement of one or more key pointer(s) to one or more body movements stored in the template database 44. The computing device 14 may then act on the model in the manner specified in connection with the movement in the template database 44. For instance, a gesture identified as a "poke" movement may be connected in the template database 44 to a user "select" function to be implemented on a model element positioned immediately in front of a representation of the user's hand within the model at the time the poking motion was detected. One having ordinary skill will immediately realize that a wide variety of gesture recognition devices and systems are within the ambit of the present invention. One of ordinary skill will also appreciate that a graphical user interface including any type of display capable of generating 2D and/or 3D models in communication with a sensor for detecting control gestures is within the ambit of the present invention.

The computing device 14 may store, execute and/or access the virtual control program 42, which may include a mapping module 48, a user input module 50, and a landscape module 52. The computing device 14 may also incorporate and/or access an equipment and structure database 54, a data handle library database 56, and a topography database 58. The databases 44, 54, 56, 58 may be embodied by any organized collection of data and may include schemas, tables, queries, reports, and so forth which may be implemented as data types such as bibliographic, full-text, numeric, images, or the like and combinations thereof. The databases 44, 54, 56, 58 may be stored in memory that resides in one computing machine, or may be stored in a plurality of computing machines, and may be stored locally on the computing device 14 and/or remotely (e.g., by a cloud storage service). The computing device 14 may communicate with the databases 44, 54, 56, 58 through the communication network 22 and/or directly. In addition, the databases 44, 54, 56, 58 may interface with, and be accessed through, one or more database management systems, as is commonly known, in addition to or complementary with direct or indirect interfacing with the virtual control program 42.

It is foreseen that a portion of the functions executed at the computing device 14 and/or according to instructions of the virtual control program and described herein (e.g., instructions for rendering virtual representations) may be performed by commercially available software such as the 3D image rendering and/or gesture acquisition and analysis software referenced above without departing from the spirit of the present invention. For instance, a template database and/or all or some of the gesture analysis, relation to an action to be taken in the model, and issuance of a command to alter the model accordingly, may be performed by another computing device and/or third party software (e.g., by hardware and software made available with the Kinect® system) without departing from the spirit of the present invention, preferably pursuant to customization and configuration to interface with the other components of the system 10 in view of the functions described herein.

II. Exemplary Computer-Implemented Method

Figure 4:
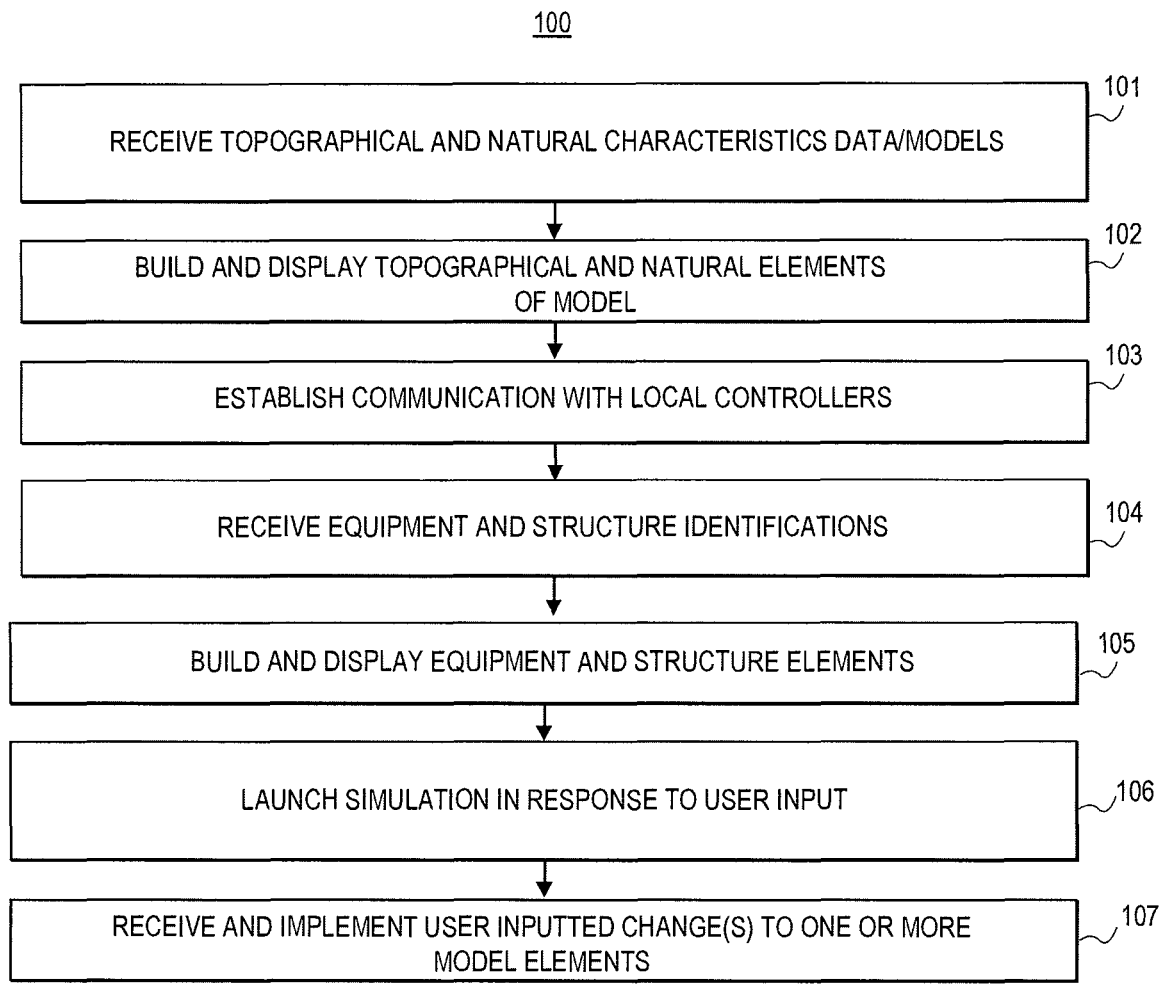
FIG. 4 lists at least a portion of the steps of an exemplary computer-implemented method for controlling a plurality of mobile agricultural devices in accordance with other aspects of the present embodiments.

FIG. 4 depicts a listing of steps of an exemplary computer-implemented method 100 for enabling review and revision—in real-time or near real-time—of farm-related data and/or equipment operational parameters/settings via a user interface displaying a virtual model of farm equipment, systems, structures and related data and characteristics. The steps may be performed in the order shown in FIG. 4, or they may be performed in a different order. Furthermore, some steps may be performed concurrently as opposed to sequentially. In addition, some steps may be optional.

Figure 2:
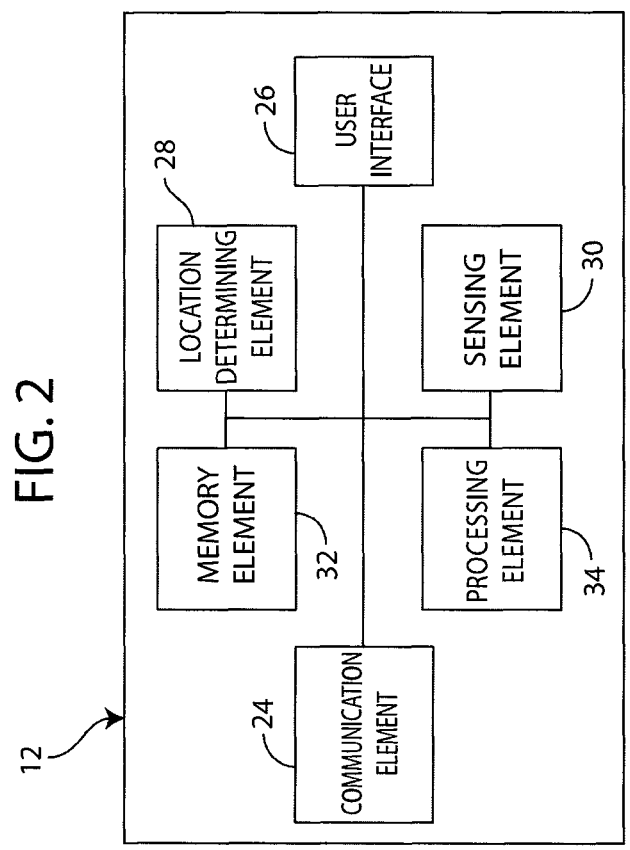
FIG. 2 illustrates various components of an exemplary local controller shown in block schematic form.

The computer-implemented method 100 is described below, for ease of reference, as being executed by exemplary devices introduced with the embodiments illustrated in FIGS. 1-3. For example, the steps of the computer-implemented method 100 may be performed by the computing device 14 and user interface 26 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. A computer-readable medium may also be provided. The computer-readable medium may include an executable program, such as a virtual control program, stored thereon, wherein the program instructs one or more processing elements to perform all or certain of the steps outlined herein. The program stored on the computer-readable medium may instruct the processing element to perform additional, fewer, or alternative actions, including those discussed elsewhere herein.

Referring to step 101, the computing device 14 may access topographical and natural characteristics data/models, for example from the one or more of the sources discussed above including the topography database 58. The data may be compiled from sensor data, structured data files, and/or model or image files such as digitized topography maps, as described above. Where image files are compiled as part of the topographical and natural characteristics data, the landscape module may be configured for automated image recognition to extract key features from images and link them to a location within the model (which may, for example, enable rendering according to polyhedral mesh techniques relying on such key feature location(s) for building virtual representations of the elements).

The topographical and natural characteristics data may include all relevant data regarding the farm's model elements other than mobile implements/equipment and man-made structures associated with a local transmitter 12. Ground water data, nitrogen content data, and other similar relevant data are preferably modeled from the topography database along with soil and pertinent landmark data making up such physical features of the farm.

Referring to step 102, the landscape module 52 of the virtual control program 42 may build model elements other than the mobile implements/equipment and man-made structures associated with a local transmitter 12 to provide a framework for incorporating additional elements. More particularly, the landscape module 52 may assemble, consolidate and/or reconcile the topographical and natural characteristics data according to known techniques for generating visual representations and/or texturization of a landscape, natural features, other relevant physical features of the farm. The landscape module 52 may instruct display of these initial portions of the model at the display 20 of the user interface 16. Preferably, the model is constructed as a 3D model to optimize the contextual benefits afforded by embodiments of the present invention.

In addition, the landscape module 52 preferably incorporates data handles for any natural characteristics data made available in the topography database—such as estimated water reservoir volume for storage ponds—into the model. Moreover, the landscape module 52 is preferably configured to generate visual indications of data "gaps." A "gap" is a portion of an area within the outer boundaries of the model (see discussion below) which contains unknown physical characteristics and/or where conflicting data exists regarding such physical features. The visual indications may include blacked or greyed areas. Preferably, the landscape module 52 is configured to extrapolate and/or interpolate from surrounding topography to "fill in" gaps with substantially complementary physical features (e.g., by assuming a constant slope of land between two known points along a ground surface). Filled in areas are preferably greyed out, surrounding in red outlining, or otherwise indicated so that the user knows that the depicted filled in features represent guesses and assumptions on the part of the landscape module 52. The landscape module 52 may also maintain a listing of each mobile piece of equipment on the farm, and/or of external assets (such as satellite imagery services), to which it may automatically issue coverage requests (e.g., requesting passes to record optical sensor data) to fill in gaps in the data.

The model may be constructed according to known modeling and/or simulation techniques, including mesh-based or meshfree finite element method(s) pursuant to which elements and nodes are defined within the model and/or computational fluid dynamics equations. The virtual control program 42 may manage the underlying mathematical simulation aspects of the model while rendering the virtual representations of model elements in conjunction with commercially available software such as that referenced herein. However, one of ordinary skill will appreciate that simulation and rendering responsibilities may be alternatively distributed and/or achieved using a variety of known techniques within the ambit of the present invention.

Preferably, the user defines outer boundary coordinates (at least latitude and longitude coordinates) for the farm to limit the relevant area for rendering. An outer boundary may, for example, be drawn as a line around the boundary of the farm using commercially available surface imaging software such as that made available under the mark Google Earth™ or the like. The outer boundary may be communicated to the landscape module 52 as a series of latitude and longitude coordinates for use in building the module. It is also foreseen that the computing device 14 may translate property descriptions—for instance as enunciated in one or more property deed(s)—into recognizable boundaries for use in the model without departing from the spirit of the present invention. In addition, in some embodiments the virtual control program 42 may be configured to automatically determine dynamic boundaries based on relevance, the boundary being shiftable based upon the detected or otherwise known position of the tangible model elements at any given time.

Figure 5:
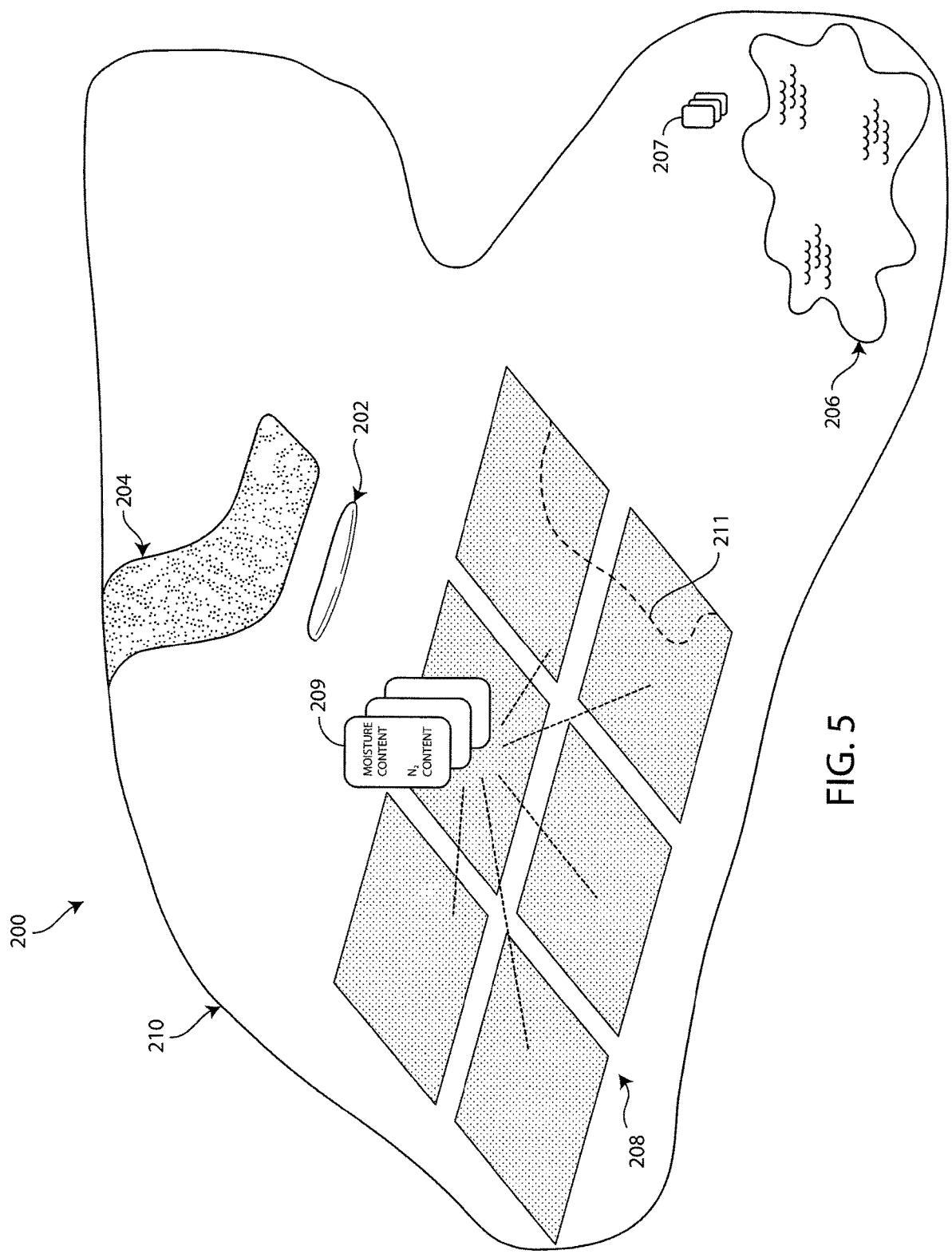
FIG. 5 illustrates landscape portions of an exemplary three-dimensional model displayed by a graphical user interface in accordance with still other aspects of the present embodiments.

Turning briefly to FIG. 5, an exemplary landscape portion of a three-dimensional model 200 is illustrated including a berm 202, a road 204, a storage pond 206 with associated data handles 207, and six fields 208 with associated data handles 209. Additional intangible elements of the model 200 include an outer boundary 210 surrounding the tangible elements of the model 200 and a boundary 211 surrounding a "low area" (see discussion above) in the fields 208. The boundaries 210, 211 may be generated by the user and/or automatically by the computing device 14.

Referring to step 103, the computing device 14 may establish communication with the plurality of local controllers 12. The plurality of local controllers 12 preferably include at least two controllers 12 mounted respectively to functionally and physically separate mobile farm implements, such as a combine and an independently-movable baling implement. More preferably, a local controller 12 is mounted to and/or otherwise associated with each powered, mechanized and/or mobile implement and man-made structure on the farm. Moreover, several local controllers 12 may be mounted to a single device—such as a movable irrigation device—to monitor the location of and/or collect sensor data from multiple parts of the device.

Communication with the local controllers 12 may be established via a communication network 22. For example, the communication element 36 of the computing device 14 and the communication elements 24 of the local controllers 12 may be configured to operate on a dedicated wireless channel or frequency and/or according to a unique embedded system code identifying them to a single farm and/or model. The user may additionally set up the communication elements 26, 24 for communication, for instance by providing each local controller 12 with an IP address of the computing device 14. It is foreseen that establishing communication and/or cooperative identification of the various controllers 12 and computing device 14 may be achieved by a variety of means without departing from the spirit of the present invention.

Signals and data exchanged between the communication elements 36, 24 may be managed at the computing device 14 and/or remotely before conveyance to the computing device 14 (for example, by a centralized remote server that collects signals from multiple farms, organizes them according to unique embedded system codes, and transmits the signals to the identified computing device 14 and/or local controller(s) 12). Each local controller 12 and the computing device 14 may also be assigned a unique device ID (e.g., a sub-ID appended to the system ID, and/or a physical/virtual/logical address), which may be used, for example by the computing device 14, to target communications and/or commands to only specific device(s) such as a single controller or group of controllers 12. More particularly, for each model element the user may enter, or the computing device 14 may otherwise automatically acquire, a unique address or identifier for one or more local controller(s) 12 mounted on or otherwise associated with the model element. The unique address or identifier might comprise an IP address, a MAC address, or other identifier the computing device 14 may key to the model element within memory (e.g., for purposes of linking incoming data to a model element and/or issuing commands) and/or may use to establish electronic communication with the model element according to step 103 (described below).

Referring to step 104, the computing device 14 may receive equipment and structure identifications. Each identification may comprise an initial definition for a tangible model element and/or an instruction to incorporate a new tangible model element into the model, and may be assigned a unique component identifier within the system 10. The user and/or the user interface 26 may communicate the identifications to the computing device 14 via the user interface 16. For example, a user may interact with the user interface 26 to identify a new tractor working on the farm that should be included in the model. The user may select a tractor type (e.g., year, make and model) and assign one or more of the plurality of local controllers 12 to the tractor. The computing device 14 may also or alternatively receive equipment and structure identifications from the local controllers 12 automatically, particularly where the local controllers 12 are configured to store (and, preferably, periodically update) in memory elements 32 identifying, parametric and status information regarding the equipment and structures to which they are mounted. The identifications may be transmitted upon initiation activation of each local controller 12, upon request issued by the computing device 14, or otherwise without departing from the spirit of the present invention.

The computing device 14 may manually obtain additional definition regarding each new model element from the user and/or may access the equipment and structure database 54 to automatically populate a number of data fields within the definition for the new model element. With reference to the exemplary tractor referenced above, the computing device 14 may populate data fields such as shape, dimensions, fuel capacity, functional elements and capabilities, and other data useful for generating a representation of the tractor and/or for simulation. For another example, the user may define a new mechanical move irrigation device, such as a center pivot or lateral move sprinkler. The computing device 14 may also or alternatively access the equipment and structure database 54 and/or the topography database 58 to automatically populate a number of data fields within the definition for the new model element, such as water source; maximum and/or available speed(s); maximum and/or available flow and spread rate(s); length and average or maximum height and other dimensional characteristics; typical run duration, speed, pivot(s) and/or flow rates, and other data useful for generating a representation of the irrigation unit and/or for modeling.

The additional definition requested from the user and/or obtained from the equipment and structure database 54 may be pre-determined and/or customizable by the user, and may vary with equipment type selected by the user. The initial and/or additional definition may also or alternatively be automatically supplied by one or more local controller(s) 12, for instance where the local controller(s) 12 include local memory element(s) 32 configured to store information regarding the equipment and/or structure(s) to which they are mounted. Information supplied by the local controller(s) 12 may also be stored in one or more of database(s) 44, 54, 56, 58 upon or following acquisition by the computing device 14. In an embodiment, therefore, receipt of equipment and structure identifications 101 may mostly or completely be achieved through simple links with local controllers 12 that automatically provide definitional information to the computing device 14 for use in populating the model.

Tangible model elements may include any equipment or structure(s) that may be found on a farm, for example farm buildings; grain storage facilities; animal containment facilities such as paddocks; field definitions; irrigation machines such as center pivot or lateral move irrigation machines; pump stations for pumping irrigation water, fuel or other liquids; tractors; harvesting equipment; soil moisture stations and/or weather stations; water reservoirs such as storage ponds; transportations vehicles such as those used for moving grain or animals; and/or fertilizing vehicles. It is foreseen that other tangible model elements, such as landscape elements, may be included without departing from the spirit of the present invention.

The computing device 14 may also utilize manual input and/or information stored in the equipment and structure database 54 and/or data handle library 56 to automatically establish mathematical and/or representational relationships between the various equipment and structures identified to the computing device 14. For example, if first and second controllers 12 are identified as being mounted to the same tractor, with the first controller 12 monitoring and controlling engine throttle and the second controller 12 monitoring and controlling the tractor's power take-off, the computing device 14 may establish mathematical relationships and/or operational parameters and thresholds relating data and representational data handles derived from the first and second controllers 12. For another example, third and fourth controllers 12 may be mounted to a lateral move sprinkler, with the third controller 12 measuring pressure and controlling a valve at a common water supply line and the fourth controller 12 monitoring ground speed and controlling a drive motor mounted to a tower of the sprinkler. The computing device 14 may establish mathematical relationships and/or operational parameters and thresholds relating data and representational data handles derived from the third and fourth controllers 12, for example relating ground speed to flow rate (derived from the pressure measurement) in view of a desired watering rate per unit area of the soil. For yet another example, a flow rate data handle associated with the third controller 12 may be related to an estimated water volume data handle at a storage pond.

Referring now to step 105, the mapping module 48 of the virtual control program 42 may build the equipment and structure elements identified in step 104. This may include scaling at least some of the equipment and structural elements up to increase visibility. This may also include organizing and placing viewer-facing data handles proximate respective tangible elements of the model. The mapping module 48 may instruct display of the equipment and structure elements at the display 20 of the user interface 16 and/or at one or more user interfaces 26. The model may include animations (e.g., vehicle wheels turning, water coming from sprinklers, etc.) to indicate operational states of the model elements.

The fully populated initial model may include static and/or moving elements, and is preferably displayed in 3D. Where real-time or near real-time data is supplied by local controllers 12, the model preferably includes dynamic elements adjusted periodically and/or as data is received so that the model remains as accurate as possible in representing the status of the farm and its operations.

Figure 6:
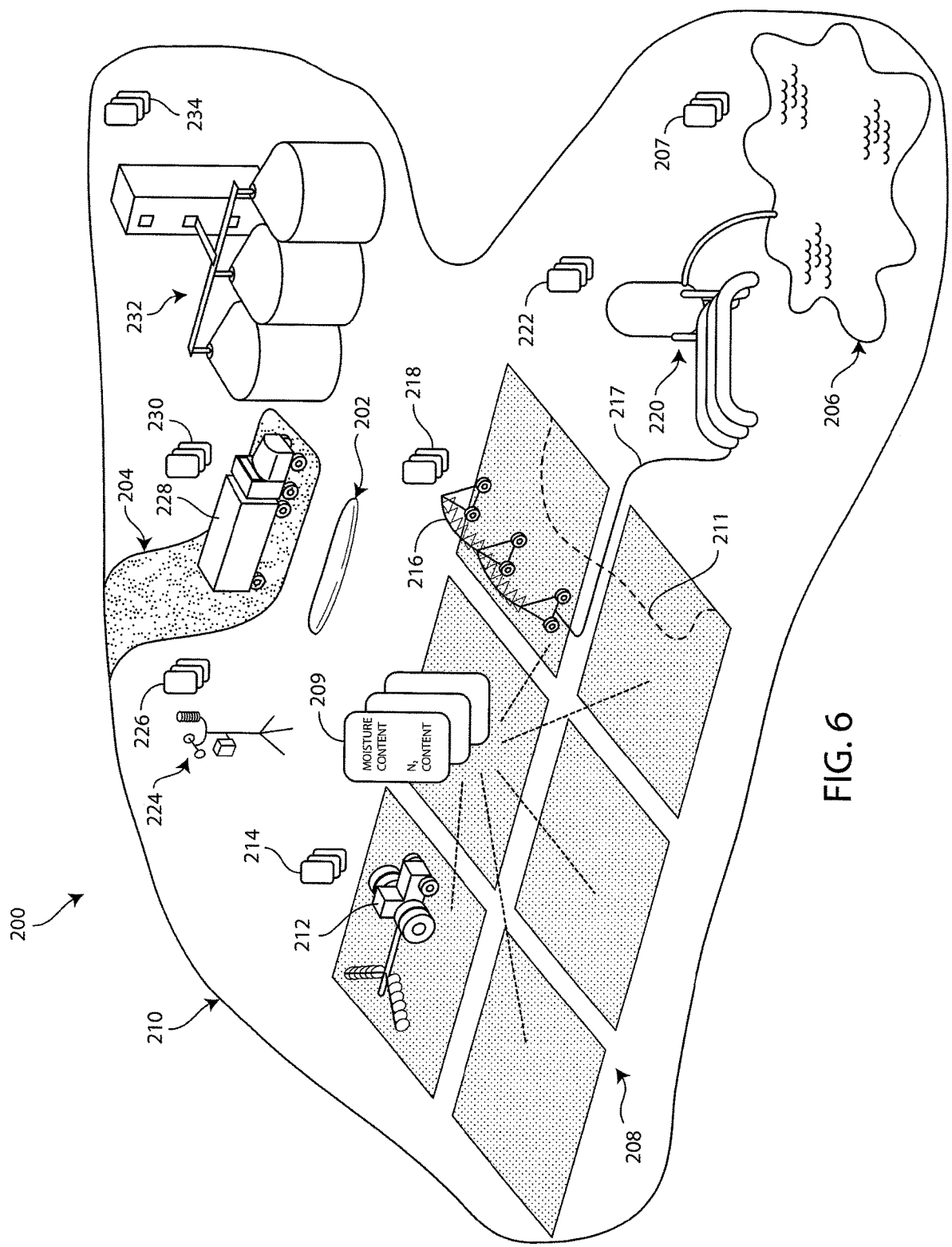
FIG. 6 illustrates the exemplary three-dimensional model of FIG. 5 with additional equipment and structure elements added.

Turning briefly to FIG. 6, the three-dimensional model 200 is illustrated including a plurality of mobile agricultural devices and structures. More particularly, the model 200 includes a tractor 212 (with associated data handles 214) towing a discing implement; a lateral move irrigation sprinkler 216, receiving water from a pipe 217 and including associated data handles 218; a pump station 220 with associated data handles 222 for pumping water from the storage pond 206 to the pipe 217; a freestanding weather station 224 with associated data handles 226; a tractor/trailer 228 with associated data handles 230; and a grain silo grouping 232 with associated data handles 234.

In a preferred embodiment, the mapping module 48 is configured to recognize patterns in behavior of the model elements in view of other model elements and circumstances tracked in the model. For example, the mapping module 48 may utilize machine learning programs or techniques. The mapping module 48 may utilize information from the movements and changes in physical state of the model elements and/or changes in the data handles, and apply that information to one or more machine learning techniques to generate one or more operational correlations or other relational observations for more general application. The machine learning techniques or programs may include curve fitting, regression model builders, convolutional or deep learning neural networks, or the like. The mapping module 48 and/or machine learning techniques may therefore recognize or determine patterns helping to improve the contextual value of the model. Based upon this data analysis, the mapping module 48 and/or machine learning techniques may, for example, provide suggestions to the user for achieving certain goals on the farm, for fixing problems identified in the model, and/or for smoothing display of the model at the user interface 16 and/or user interfaces 26. Data regression may be used alone and/or in conjunction with machine learning techniques to fit mathematical algorithms to particular relationships between model elements, for example representing the degree of pressure drop along a particular section of pipe or the amount of cooling work that must be done in an enclosed space per occupant to maintain a particular temperature differential from the ambient environment. These relationships may help improve control algorithms for farm operations.

In an example, the virtual control program 42 may periodically receive weather predictions and/or measurements via a third-party weather service API for display to the user in the model. The virtual control program 42 may use machine learning techniques to analyze historical data about the farm—including current storage pond water volume, rainfall and soil moisture content—to predict that one or more areas of a field are projected to flood if a certain amount of rainfall is received in the coming storm. The virtual control program 42 may be configured to provide an alert summarizing such conclusion(s) to the user at the user interface 16 and/or one or more user interface(s) 26.

In connection with another example, it is noted that one or more local controller(s) 12 may originate with an original equipment manufacturer and be adapted for use with the system 10. In any case, one or more of the local controllers 12 may be configured to transmit data—e.g., positional or sensed data—only infrequently and/or upon occurrence of a particular event (such as redirection, change in speed, change in flow, etc.). Moreover, multiple different local controllers 12 may each have different setting(s), rendering any model based only on real-time data severely incomplete at any given moment. To smooth the model so that it may be used at any given moment with all elements virtually represented, the virtual control program 42 may use machine learning techniques to analyze historical data about the farm and each element in the model to fill in gaps between transmissions from the local controller(s) 12, permitting continuous depiction of each element.

The virtual control program 42 may begin with an assumption that the position and properties of a tangible element are constant and/or changing at a constant rate, for example, to enable continuous representation of the tangible element between transmissions from its controller(s) 12. Over time, however, the historical data may show a pattern or patterns causing the constancy assumptions to be altered. For example, the virtual control program 42 may note that each time a baling implement (i.e., a trailing device) follows a tractor (i.e., a leading device) through a field, it stays within 100 feet of the tractor around turns. As applied to the model, if both tractor and baling implement are traveling east within a field according to a first burst of data transmissions and subsequently the tractor transmits a new location and heading in a southerly direction, the virtual control program 42 may turn the baling implement within the model to follow the tractor according to the 100-foot rule developed from machine learning and analysis of historical data, even before the baling implement transmits another burst of data indicating its new position and heading. In certain embodiments, the model may—through simulations, algorithmic approximations, and/or machine learning—improve on prior art control silos which, viewed in isolation at any given moment, fail to effectively present a wholistic representation of critical information relating to the farm.

Referring now to step 106, the computing device 14 may launch a simulation within the model in response to user input. For instance, the user may select a "Simulation Mode" option at the user interface 16, or may simply select a data handle and attempt to edit a setting, parameter and/or relationship between model elements, causing the computing device 14 to automatically enter simulation mode to accommodate the attempted change. The computing device 14 may also or alternatively be configured to query the user regarding whether his/her intent is to manually change the model in such a manner in order to better reflect the actual state of the farm to issue a command to associated device(s), or instead to run a simulation including the change(s). The user may also or alternatively select an option for changing equipment and/or operational settings in accordance with the user input, regardless of whether the change(s) are simulated first.

Referring now to step 107, the computing device 14 may receive and implement one or more user inputted changes to one or more model elements. In simulation mode, the virtual control program 42 may be configured to simulate the inputted changes and carry the change(s) forward (either in real time or in a time lapse mode, as desired by the user) and/or throughout the model so that the user may determine resulting changes in system 10 behavior and/or status. As noted above, such changes in the model are preferably stored by the computing device 14 for use by machine learning techniques and/or implementation if the user determines that the results were favorable.

User input may be converted to changes within the model by user input module 50 interpreting the gesture(s) in view of the template database 44, as discussed in more detail above. For example, a first gesture may be mapped to a zoom (in or out) function within the template database 44. A second gesture may be mapped to a panning function (e.g., left, right, up, down). A third gesture may be mapped to a point zoom function (e.g., pulling an imaginary rope may result in zooming along a line parallel to the user's linear pulling motion). A fourth gesture may be mapped to a grab and zoom/pan function, whereby the user may grab a model element and subsequently move the grabbing hand around resulting in corresponding movement of the perspective of the model. A fifth gesture may be mapped to a select element function, whereby the user may select a model element to see additional detail. For instance, the user may select a stack of data handles for an irrigation pump station to present all the stacked data handles for viewing and/or to prime a scrolling or cycling function whereby the user may use a scroll or cycle gesture to move through the data handles individually. The select element function may have multiple other uses in the model, for example to indicate a data field within a data handle in which the user wishes to make a manual input, to prime a data handle to be moved within the model using another gesture, or to otherwise prime model elements for further action.

The gesture(s) mapped to functions in the template database 44 may be combined to achieve one or more desired affects within the model. For instance, the fifth gesture (select) may, when performed on an editable data handle (such as an equipment setting), prime the data handle by causing the computing device 14 to present a spinning counting wheel or the like that may be spun to a new desired setting by another user gesture.

As discussed above, user input is preferably in the form of gesture control, which may be sensed at the user interface 16 via gesture sensor 18 and/or at one or more user interfaces 26 via sensing element(s) 30. For example, a local controller 12 (e.g., comprising a control panel) mounted to a lateral move irrigation sprinkler may include an optical sensing element 30 for receiving gesture input and a user interface 26 that displays the model to the user (preferably in 3D).

Implementation of the changes a user makes within the model may be carried out on the farm by one or more actuation mechanisms in communication with local controllers 12. For example, an onboard computer of a tractor may link to a throttle control mechanism to alter the speed of the tractor. For another example, an embodiment of the system 10 includes a number of local controllers 12 having valve control mechanisms for opening and closing valves in an irrigation system. The irrigation system may include, but is not limited to drip irrigation, trickle irrigation, micro irrigation, and/or localized irrigation. Embodiments of the system 10 may also be used with center pivot irrigation systems, lateral or linear irrigation systems, and/or other types of irrigation systems.

The user interface 16 and/or one or more user interfaces 26 may present one or more data handles within which the user may create and/or modify irrigation plans for the irrigation system. An irrigation plan may be executed by the computing device 14 to control operation of the valves via the local controllers 12 in the irrigation system. Each irrigation plan includes information for at least one irrigation zone.

An exemplary irrigation system that may be controlled with the system 10 may include one or more pumps or master valves that receive water from a reservoir, river, lake, or other water source 16; a water filtration system that filters the water before it is delivered to irrigated plants; an injector system that may be used to inject fertilizers, pesticides, and/or other substances into the water; a number of water pipes, tubes, hoses, and/or other water emitters that deliver the water to the plants; and a number of valves that control the flow of water to the water emitters. The irrigation system may also include water pipes or other fluid-carrying conduits for carrying water between the other components of the system, various check valves, shut-off valves, and other valves, and other components commonly found on irrigation systems. Each valve and its associated water emitters create an irrigation zone. Any number of these components and zones may be provided, as the specific configuration of the irrigation system is not critical and may vary from one embodiment of the invention to another without departing from the spirit or scope of the present invention.

The valve controllers 12 may be linked to any conventional actuation means or devices capable of opening and closing the valves under direction of the computing device 14. The valve controllers 12 may receive simple open and close type instructions from the computing device 14 or may have a resident memory element 32 that can receive and store detailed instructions for controlling the valves. For example, each valve controller 12 may have memory and date and clock circuitry and may receive, store, and implement a schedule of times to open and close over extended time periods. The computing device 14 signals the valve controllers 12 to open or close their respective valves in accordance with one or more irrigation plans. The valve controllers 12 may be enclosed in a waterproof housing or otherwise sealed from the environment to protect electrical components that may be damaged by water, dust or sunlight. The housing may be mounted anywhere near the irrigation system, such as near the pump or other components of a low-volume irrigation system.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology may include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

The patent claims at the end of this patent application are not intended to be construed under 35 U. S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

I claim:

1. A method for controlling a plurality of mobile agricultural devices implemented via one or more transceivers and one or more processors, the method comprising:
   establishing electronic communication with a plurality of transceivers mounted to respective ones of the plurality of mobile agricultural devices;
   building a model including a virtual representation of each of the plurality of mobile mechanical devices;
   displaying the model at a user interface including a display and a gesture sensor, wherein the gesture sensor is in electronic communication with a central computing device, the central computing device being configured to communicate with each of the plurality of transceivers;
   receiving location data regarding the plurality of mobile agricultural devices via the plurality of transceivers;
   adjusting at least one of the virtual representations of the plurality of mobile mechanical devices within the model to reflect the location data;
   receiving, via the gesture sensor of the user interface, a user input comprising data representative of body movements captured by a camera and indicative of a command relating to operation of a first mobile agricultural device of the plurality of mobile mechanical devices; and
   transmitting the user input command to a transceiver of the plurality of transceivers that is mounted to the first mobile agricultural device so as to implement a change in operation of the first mobile agricultural device.

2. The method of claim 1, wherein the gesture sensor and a transceiver of the plurality of transceivers together comprise a local controller mounted to a mobile agricultural device of the plurality of mobile agricultural devices.

3. The method of claim 1, further including adjusting the model based on at least one of the following user inputs:
   A) a zoom gesture;
   B) a panning gesture;
   C) a point zoom gesture;
   D) a grab and zoom/pan gesture; and
   E) a select gesture.

4. The method of claim 1, wherein the model includes topographical model elements built to scale with respect to one another.

5. The method of claim 4, wherein the virtual representations of the plurality of mobile agricultural devices are larger than scale with respect to the topographical model elements within the model.

6. The method of claim 1, further including—
   receiving an identification for each of the plurality of mobile agricultural devices; and
   based on each identification, automatically retrieving equipment data regarding at least one of A) a physical characteristic and B) an operational capacity, of the corresponding mobile agricultural device from an equipment and structure database,
      wherein building the model includes visually associating the retrieved equipment data with the corresponding mobile agricultural devices.

7. The method of claim 6, wherein at least one of the identifications is received automatically via one or more of the plurality of transceivers.

8. The method of claim 6, wherein at least one of the identifications is received via manual input at the user interface.

9. The method of claim 1, wherein the model includes topographical model elements built at least in part based on data received automatically via the plurality of transceivers.

10. The method of claim 1, further including receiving weather data via a weather service API and displaying a corresponding weather notification within the model at the user interface.

11. The method of claim 1, further including storing a data handle at least partly defined by the user via the user interface, wherein building the model includes visually incorporating the data handle proximate at least one of the first mobile agricultural device and a second mobile agricultural device of the plurality of mobile agricultural devices.

12. The method of claim 11, wherein the data handle relates at least one operational parameter of the first mobile agricultural device to at least one operational parameter of the second mobile agricultural device, further including—
automatically determining a secondary command based on A) the command relating to the first mechanical device, and B) the information of the data handle, and
transmitting the secondary command to a transceiver of the plurality of transceivers that is mounted to the second mobile agricultural device.

13. The method of claim 1, wherein communication with the plurality of transceivers is enabled by a plurality of unique device identifiers associated with respective ones of the plurality of transceivers.

14. The method of claim 1, wherein communication with the plurality of transceivers is enabled by use of a dedicated frequency.

15. The method of claim 1, further including—
feeding a historical data set comprising data received from the plurality of transceivers to a machine learning algorithm;
determining, via analysis of the historical data set by the machine learning algorithm, an operational correlation between a leading mobile agricultural device and a trailing mobile agricultural device of the plurality of mobile agricultural devices, the leading and trailing mobile agricultural devices having leading and trailing transceivers of the plurality of transceivers mounted respectively thereon;
receiving a data transmission from the leading transceiver;
comparing the data transmission against the operational correlation; and
applying the operational correlation to adjust the trailing mobile agricultural device within the model.

16. The method of claim 15, wherein the operational correlation specifies a relationship between a movement of the leading mobile agricultural device and a corresponding movement of the trailing mobile agricultural device, the data transmission indicates the occurrence of the movement of the leading mobile agricultural device, and the operational correlation is applied to adjust the trailing mobile agricultural device within the model according to the correlation before receipt of another data transmission from the trailing transceiver confirming occurrence of the corresponding movement of the trailing mobile agricultural device.

17. The method of claim 1, further including simulating one or more aspects of the model based on the user input.

18. The method of claim 17, further including storing the user input, wherein transmitting the user input is triggered by receipt of an instruction to implement the stored user input.

19. The method of claim 1, wherein the model is a three-dimensional model.

20. A method for controlling a plurality of mobile agricultural devices implemented via one or more transceivers and one or more processors, the method comprising:
establishing electronic communication with a plurality of transceivers mounted to respective ones of the plurality of mobile agricultural devices;
building a model including a virtual representation of each of the plurality of mobile mechanical devices;
displaying the model at a user interface including a display and a gesture sensor;
receiving location data regarding the plurality of mobile agricultural devices via the plurality of transceivers;
adjusting at least one of the virtual representations of the plurality of mobile mechanical devices within the model to reflect the location data;
receiving, via the gesture sensor of the user interface, a user input comprising a command relating to operation of a first mobile agricultural device of the plurality of mobile mechanical devices;
transmitting the user input command to a transceiver of the plurality of transceivers that is mounted to the first mobile agricultural device so as to implement a change in operation of the first mobile agricultural device;
feeding a historical data set comprising data received from the plurality of transceivers to a machine learning algorithm;
determining, via analysis of the historical data set by the machine learning algorithm, an operational correlation between a first one of the mobile agricultural devices and a second one of the mobile agricultural devices;
receiving a data transmission from a transceiver on the first mobile agricultural device;
comparing the data transmission against the operational correlation; and
applying the operational correlation to adjust the second mobile agricultural device within the model.

* * * * *